United States Patent
Nasserrafi et al.

(10) Patent No.: US 9,347,558 B2
(45) Date of Patent: May 24, 2016

(54) WROUGHT AND CAST ALUMINUM ALLOY WITH IMPROVED RESISTANCE TO MECHANICAL PROPERTY DEGRADATION

(75) Inventors: Rahbar Nasserrafi, Andover, KS (US); LaVerne L. Waalkes, Valley Center, KS (US); Gerald E. Hicks, Wichita, KS (US); Kevin Obrachta, Wichita, KS (US); David E. Jakstis, Andover, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 933 days.

(21) Appl. No.: 13/217,774

(22) Filed: Aug. 25, 2011

(65) Prior Publication Data

US 2012/0048390 A1    Mar. 1, 2012

Related U.S. Application Data

(60) Provisional application No. 61/376,957, filed on Aug. 25, 2010.

(51) Int. Cl.
| | |
|---|---|
| *C22C 21/12* | (2006.01) |
| *C22C 21/16* | (2006.01) |
| *C22C 21/18* | (2006.01) |
| *C22F 1/057* | (2006.01) |
| *F16J 1/01* | (2006.01) |
| *C21D 7/06* | (2006.01) |
| *B21B 3/00* | (2006.01) |

(Continued)

(52) U.S. Cl.
CPC ... *F16J 1/01* (2013.01); *C21D 7/06* (2013.01); *C22C 21/16* (2013.01); *C22F 1/057* (2013.01); *B21B 2003/001* (2013.01); *F16C 3/04* (2013.01); *F16C 7/02* (2013.01); *Y10T 74/19* (2015.01); *Y10T 74/2142* (2015.01); *Y10T 74/2173* (2015.01); *Y10T 137/0536* (2015.04)

(58) Field of Classification Search
CPC ........ C22C 21/12; C22C 21/16; C22C 21/18; C22F 1/057
See application file for complete search history.

(56) References Cited

U.S. PATENT DOCUMENTS

| | | |
|---|---|---|
| 4,772,342 A | 9/1988 | Polmear |
| 5,055,256 A | 10/1991 | Sigworth et al. |
| 5,115,770 A | 5/1992 | Yen et al. |

(Continued)

FOREIGN PATENT DOCUMENTS

| | | | |
|---|---|---|---|
| CH | 298572 C | * | 7/1954 |
| EP | 1249303 | | 10/2002 |
| WO | 9405820 | | 3/1994 |

OTHER PUBLICATIONS

'Aluminum and Aluminum Alloys', ASM International, 1993, p. 639.*

(Continued)

*Primary Examiner* — Roy King
*Assistant Examiner* — Janelle Morillo
(74) *Attorney, Agent, or Firm* — Hovey Williams LLP

(57) ABSTRACT

Aluminum-based alloys for casting or wrought processing having improved combinations of properties, including improved high temperature strength, are provided. The alloys generally comprise copper, magnesium, silver, and titanium, along with scandium and/or cobalt. Zirconium, zinc, and/or vanadium may also optionally be present in the alloy. When cobalt is present in the alloy, nickel may also optionally be present. Cast and wrought products, as well as methods of making the same using the alloys, are also disclosed.

26 Claims, 7 Drawing Sheets

(51) Int. Cl.
   *F16C 3/04*       (2006.01)
   *F16C 7/02*       (2006.01)

(56) References Cited

U.S. PATENT DOCUMENTS

| | | | |
|---|---|---|---|
| 5,259,897 A | 11/1993 | Pickens et al. | |
| 5,376,192 A | 12/1994 | Cassada, III | |
| 5,455,003 A | 10/1995 | Pickens et al. | |
| 5,512,112 A | 4/1996 | Cassada, III | |
| 5,597,529 A | 1/1997 | Tack | |
| 5,620,652 A | 4/1997 | Tack et al. | |
| 5,630,889 A | 5/1997 | Karabin | |
| 5,652,063 A | 7/1997 | Karabin | |
| 5,665,306 A | 9/1997 | Karabin | |
| 5,738,735 A | 4/1998 | Bechet | |
| 5,759,302 A | 6/1998 | Nakai et al. | |
| 5,800,927 A | 9/1998 | Karabin | |
| 5,865,911 A | 2/1999 | Miyasato et al. | |
| 5,879,475 A | 3/1999 | Karabin | |
| 6,027,582 A | 2/2000 | Shahani et al. | |
| 6,126,898 A | 10/2000 | Butler | |
| 6,368,427 B1 | 4/2002 | Sigworth | |
| 6,579,386 B1 | 6/2003 | Bjorkman, Jr. et al. | |
| 6,592,687 B1 | 7/2003 | Lee et al. | |
| 6,969,432 B2 | 11/2005 | Raynaud et al. | |
| 6,972,110 B2 | 12/2005 | Chakrabarti et al. | |
| 7,177,387 B2 | 2/2007 | Yasunaga et al. | |
| 7,229,508 B2 | 6/2007 | Cho et al. | |
| 7,323,068 B2 | 1/2008 | Benedictus et al. | |
| 7,547,366 B2 | 6/2009 | Lin et al. | |
| 2006/0137783 A1 | 6/2006 | Aruga et al. | |
| 2006/0157172 A1 | 7/2006 | Fischer et al. | |
| 2006/0269437 A1 | 11/2006 | Pandey | |
| 2007/0102071 A1* | 5/2007 | Druschitz | 148/552 |
| 2008/0305354 A1* | 12/2008 | Lee et al. | 428/576 |
| 2009/0260723 A1 | 10/2009 | Pandey | |
| 2010/0139815 A1 | 6/2010 | Pandey | |
| 2010/0143177 A1 | 6/2010 | Pandey | |
| 2011/0030856 A1 | 2/2011 | Warner et al. | |
| 2011/0176957 A1 | 7/2011 | Che et al. | |

OTHER PUBLICATIONS

MIL-HDBK-1265 Aug. 19, 1998 (Radiographic Classification handbook for DoD).
www.aircraftspruce.com/catalog/mepages/aluminfo.php (Accessed Aug. 2011).

* cited by examiner

WROUGHT AND CAST ALUMINUM ALLOY WITH IMPROVED RESISTANCE TO MECHANICAL PROPERTY DEGRADATION

CROSS-REFERENCE TO RELATED APPLICATIONS

The present application claims the priority benefit of U.S. Provisional Patent Application Ser. No. 61/376,957, filed Aug. 25, 2010, entitled WROUGHT AND CAST ALUMINUM ALLOY WITH IMPROVED RESISTANCE TO MECHANICAL PROPERTY DEGRADATION, incorporated by reference in its entirety herein.

BACKGROUND OF THE INVENTION

1. Field of the Invention

The present invention relates to aluminum-based alloys suitable for high temperature applications including aerospace. The alloys can be processed to various product forms, e.g., sheet, thin plate or extruded, forged or age-formed products.

2. Description of Related Art

Aluminum alloys are widely used in engineering structures and components where low weight or corrosion resistance is required. Wrought alloys are commonly used in the manufacture of aircraft structural components, such as underwing applications. Cast aluminum alloys yield cost-effective products, although they generally have lower tensile strengths than wrought alloys. Aluminum alloys are particularly important in aerospace manufacturing for their high strength-to-weight ratio, as well as in the manufacture of lightweight, high-end automobile components (e.g., engine block or wheel/brake components). However, due to the low melting point of aluminum, many aluminum-based alloys have the drawback of limited mechanical properties at high temperatures. For example, underwing metallic structures and components in modern commercial aircraft are intermittently exposed to elevated temperatures during flight, which over time results in significant degradation of the alloy strength and toughness. In addition, there is a continuing push for better efficiency and fuel economy; however, higher efficiency engines run much hotter such that traditional aluminum-based alloys can no longer be used due to significant decreases in strength, ductility, and toughness over time. One alternative has been the use of much thicker and heavier aluminum pieces to counteract the loss of strength over time. However, this added weight defeats the purpose of the higher efficiency engine and also adds to the initial cost of the piece. Titanium alloys have been proposed as alternatives to aluminum-based alloys, due to their high tensile strength and toughness (i.e., damage tolerance, even at extreme temperatures), lightweight, extraordinary corrosion resistance, and ability to withstand extreme temperatures. However, due to the increased expense of using titanium over aluminum, the development of aluminum-based alloys with improved elevated temperature properties remains important.

Attempts to develop aluminum alloys having one or more improved properties (e.g., higher strength-to-weight ratio) for casting or wrought processing, often results in sacrificing other properties of the alloys (e.g., fatigue performance or damage tolerance). Numerous alloys have been proposed. One of the most common cast aluminum alloy systems, is Al—Si (e.g., AlSi$_7$Mg), where high levels of silicon (>4%) contribute to good casting characteristics. Another aluminum alloy system with good mechanical properties is Al—Li. However, Al—Li alloys are not only more expensive, but carry a high risk of fire and explosion, complicating their manufacture. Thus, there remains a need in the art for aluminum alloys with improved properties that do not suffer from the drawbacks of previously proposed systems.

SUMMARY OF THE INVENTION

The present invention is broadly concerned with new aluminum-based alloys, cast and wrought alloy products, and methods of forming the same. The alloys comprise Cu, Mg, Ag, Ti, optionally Zr, Zn, Ni, and/or V, along with Se and/or Co, and have exceptional properties, including improved ductility, toughness, and high heat strength, described in more detail herein, as compared to conventional aluminum alloys.

In one aspect, an aluminum-based alloy substantially free of Mn is provided. The alloy comprises from about 4 to about 6% by weight Cu; from about 0.2 to about 1% by weight Mg; from about 0.1 to about 1.5% by weight Ag; from about 0.15 to about 0.35% by weight Ti; optionally from about 0.1 to about 0.2% by weight Zr; an element selected from the group consisting of from about 0.05 to about 1% by weight Sc and from about 0.05 to about 1.5% by weight Co; and balance aluminum and incidental elements and impurities, wherein the percentages by weight are based upon the total weight of the alloy taken as 100% by weight.

The invention is also concerned with a wrought or cast product formed from an aluminum-based alloy substantially free of Mn. The alloy comprises greater than about 4% by weight Cu; less than about 1% by weight Mg, wherein Cu+Mg is from about 4.5 to about 6.75% by weight; from about 0.1 to about 1.5% by weight Ag; from about 0.15 to about 0.35% by weight Ti; optionally from about 0.1 to about 0.2% by weight Zr; an element selected from the group consisting of from about 0.05 to about 1% by weight Sc and from about 0.05 to about 1.5% by weight Co; and balance aluminum and incidental elements and impurities, wherein the percentages by weight are based upon the total weight of the alloy taken as 100% by weight.

A cast aluminum alloy product that is substantially free of Mn is also provided. The cast product comprises greater than about 4% by weight Cu; less than about 1% by weight Mg, wherein Cu+Mg is from about 4.5 to about 6.75% by weight; from about 0.1 to about 1.5% by weight Ag; from about 0.15 to about 0.35% by weight Ti; optionally from about 0.1 to about 0.2% by weight Zr; from about 0.05 to about 1% by weight Sc; and balance aluminum and incidental elements and impurities, wherein the percentages by weight are based upon the total weight of the alloy taken as 100% by weight.

A method of making a cast aluminum alloy product is also provided. The method comprises (a) providing an alloy in molten form; (b) pouring the alloy into a casting mold; and (c) allowing the alloy to solidify to yield the cast aluminum alloy product. The alloy comprises greater than about 4% by weight Cu; less than about 1% by weight Mg, wherein Cu+Mg is from about 4.5 to about 6.75% by weight; from about 0.1 to about 1.5% by weight Ag; from about 0.15 to about 0.35% by weight Ti; optionally from about 0.1 to about 0.2% by weight Zr; an element selected from the group consisting of from about 0.05 to about 1% by weight Sc and from about 0.05 to about 1.5% by weight Co; and balance aluminum and incidental elements and impurities, wherein the percentages by weight are based upon the total weight of the alloy taken as 100% by weight. The alloy is substantially free of Mn.

The invention is also concerned with a wrought aluminum alloy product. The wrought product comprises greater than about 4% by weight Cu; less than about 1% by weight Mg, wherein Cu+Mg is from about 4.5 to about 6.75% by weight; from about 0.1 to about 1.5% by weight Ag; from about 0.15 to about 0.35% by weight Ti; optionally from about 0.1 to about 0.2% by weight Zr; from about 0.05 to about 1.5% by weight Co; and balance consisting essentially of aluminum and incidental elements and impurities, wherein the percentages by weight are based upon the total weight of the alloy taken as 100% by weight. The alloy is substantially free of Mn.

A method of forming a wrought aluminum alloy product is also provided. The method comprises (a) providing a casting of an alloy; and (b) shaping the casting by a process selected from the group consisting of forging, extruding, rolling, pressing, stamping, straightening, stretching, squeezing, bending, drawing, shearing, compression stress relief, shot-peening, peen-forming, and combinations thereof to yield the wrought aluminum alloy product. The casting alloys comprise greater than about 4% by weight Cu; less than about 1% by weight Mg, wherein Cu+Mg is from about 4.5 to about 6.75% by weight; from about 0.1 to about 1.5% by weight Ag; from about 0.15 to about 0.35% by weight Ti; optionally from about 0.1 to about 0.2% by weight Zr; an element selected from the group consisting of from about 0.05 to about 1% by weight Sc and from about 0.05 to about 1.5% by weight Co; and balance aluminum and incidental elements and impurities, wherein the percentages by weight are based upon the total weight of the alloy taken as 100% by weight. The alloy is substantially free of Mn.

The invention is also concerned with an aerospace structural component formed from an aluminum alloy. The alloy comprises greater than about 4% by weight Cu; less than about 1% by weight Mg, wherein Cu+Mg is from about 4.5 to about 6.75% by weight; from about 0.1 to about 1.5% by weight Ag; from about 0.15 to about 0.35% by weight Ti; optionally from about 0.1 to about 0.2% by weight Zr; an element selected from the group consisting of from about 0.05 to about 1% by weight Sc and from about 0.05 to about 1.5% by weight Co; and balance consisting essentially of aluminum and incidental elements and impurities, wherein the percentages by weight are based upon the total weight of the alloy taken as 100% by weight. The alloy is substantially free of Mn.

DETAILED DESCRIPTION

Figure 1A:
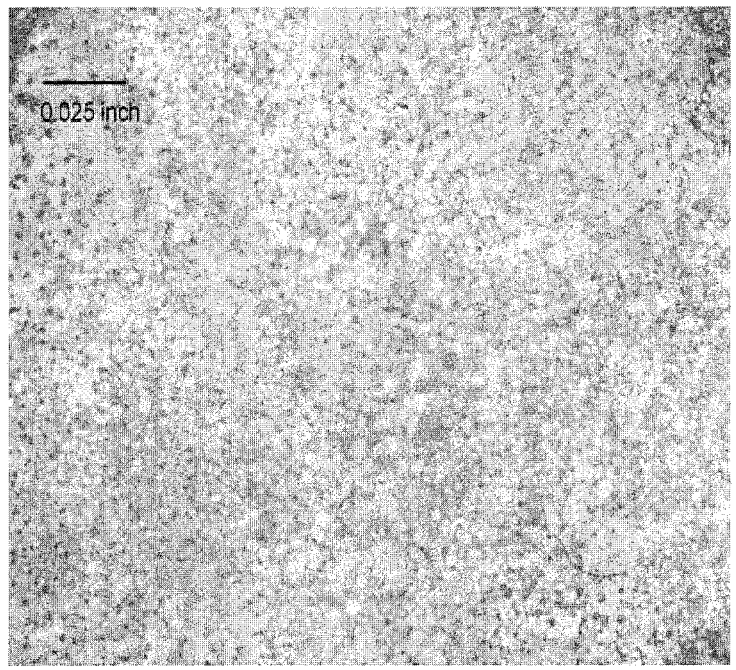
FIG. 1(A) is a photomicrograph of inventive Alloy #16 prepared in Example 1.

In more detail, the present invention is concerned with aluminum-based alloys, and particularly aluminum-copper alloys with enhanced abilities to withstand mechanical property degradation due to prolonged exposure to elevated temperatures. These alloys have unique combinations of properties not heretofore seen in previous aluminum alloy systems. The alloys are particularly suitable for use in forming cast and/or wrought products, including those used in aerospace applications, such as aircraft plate and sheet, forged shaped products, cast components, and extrusions. The new alloys are exceptional for wrought processing, with very good dimensional and structural stability. They also have significantly improved castability (similar to Al—Si alloys), but maintain strength like a high strength alloy (e.g., 2000 or 7000 series alloys), with a remarkable internal quality including an extremely fine grain microstructure, and no dendrite formation, shrinkage voids, or porosity, as explained in more detail below.

The alloys comprise (or consist essentially of) copper (Cu), magnesium (Mg), silver (Ag), and titanium (Ti), along with scandium (Sc) and/or cobalt (Co). Zirconium (Zr) may also optionally be present in the alloy. Cu is present in the alloy in an amount greater than about 4% by weight, preferably from about 4 to about 6% by weight, more preferably from about 4.5 to about 5.5% by weight, even more preferably from about 5 to about 5.5% by weight, and most preferably from about 5.25 to about 5.35% by weight, based upon the total weight of the alloy taken as 100% by weight. Depending upon the embodiment, Mg is present in the alloy in an amount of less than about 1% by weight, preferably from about 0.2 to about 1% by weight, more preferably from about 0.4 to about 0.9% by weight, and even more preferably from about 0.5 to about 0.85% by weight, based upon the total weight of the alloy taken as 100% by weight. In one or more embodiments of the invention, the total copper and magnesium content (Cu+Mg) will preferably be from about 4.5 to about 6.75% by weight and more preferably from about 5 to about 6.5% by weight, based upon the total weight of the alloy taken as 100% by weight. In embodiments particularly suited for castings, the ratio of Cu:Mg is preferably from about 4:1 to about 12:1, and more preferably from about 4:1 to about 10:1. When Co is not used in the alloy, the Mg content is preferably adjusted to be within the higher end of the preferred ranges above (i.e., Mg content is increased).

Ag is present in the alloy in an amount of less than about 1.5% by weight, preferably from about 0.1 to about 1.5% by weight, more preferably from about 0.2 to about 1% by weight, even more preferably from about 0.3 to about 0.8% by weight, and most preferably from about 0.45 to about 0.55% by weight, based upon the total weight of the alloy taken as 100% by weight. Depending upon the embodiment, Ti is present in the alloy in an amount of from about 0.15 to about 0.35% by weight, preferably from about 0.15 to about 0.3% by weight, and even more preferably from about 0.15 to about 0.28% by weight, based upon the total weight of the alloy taken as 100% by weight. In one or more embodiments, Ti content is preferably increased (i.e., selected from the higher end of the above ranges) when Co is present in the alloy.

When present, the amount of Sc in the alloy will be less than about 1% by weight, preferably from about 0.05 to about 1% by weight, more preferably from about 0.2 to about 0.5% by weight, and even more preferably from about 0.25 to about 0.35% by weight, based upon the total weight of the alloy taken as 100% by weight. When present, the amount of Co in the alloy will be from about 0.05 to about 1.5% by weight, preferably from about 0.2 to about 0.5% by weight, and even more preferably from about 0.25 to about 0.35% by weight, based upon the total weight of the alloy taken as 100% by weight. When present, the amount of Zr in the alloy will be from about 0.1 to about 0.2% by weight, and preferably from about 0.1 to about 0.15% by weight, based upon the total weight of the alloy taken as 100% by weight. In one or more embodiments particularly suited to castings, the ratio of Sc:Zr is preferably from about 1:1 to about 3:1. For castings, the ratio of Ti:Zr is also preferably from about 1.5:1 to about 6:1. For wrought products, the ratio of Ti:Zr is preferably from about 1:1 to about 5:1.

Additional optional ingredients that can be included in the alloy include Vanadium (V) and Zinc (Zn). When present, V may be included in the alloy in an amount of up to about 0.1% by weight, preferably from about 0.05 to about 0.1% by weight, and more preferably from about 0.08 to about 0.1% by weight, based upon the total weight of the alloy taken as 100% by weight. In one or more embodiments particularly suited for castings the total titanium, zirconium, and vanadium content (Ti+Zr+V, when present) is preferably from about 0.25% to about 0.55% by weight, and more preferably from about 0.3% to about 5% by weight, based upon the total weight of the alloy taken as 100% by weight. In other embodiments, the alloy is preferably substantially vanadium-free, as described below. When present, the amount of Zn in the alloy may be up to about 1% by weight, preferably from about 0.05 to about 1% by weight, more preferably from about 0.4 to about 0.9% by weight, and even more preferably from about 0.5 to about 0.85% by weight, based upon the total weight of the alloy taken as 100% by weight. In one or more embodiments particularly suited to wrought products, the ratio of Mg:Zn (when present) is preferably greater than about 0.5:1, more preferably from about 1:1 to about 3:1, and even more preferably about 1.5:1. In one or more embodiments, Nickel may also be present in the alloy in combination with Co (Co+Ni), although the Ni content is preferably minimized in the present alloys. In particular, the ratio of Co:Ni in this embodiment is preferably greater than about 2:1, more preferably between about 2:1 to about 10:1, and even more preferably about 9:1. The alloy may also include up to about 0.5% by weight Si in certain cast embodiments, based upon the total weight of the alloy taken as 100% by weight; however, the use of Si is preferably substantially avoided in the present alloys.

The balance of the alloy consists essentially (or even consists) of aluminum and incidental elements and impurities, if any. References herein to "incidental elements and impurities" will be understood to mean elements and impurity inclusions that are not intentionally added to the alloy, but which unavoidably occur in the alloy as a result of manufacturing processes or natural impurities in the individual alloy elements. Preferably, each impurity element is present at up to about 0.05% by weight maximum, with total impurities being up to about 0.15% by weight maximum, based upon the total weight of the alloy taken as 100% by weight.

In one or more embodiments, the alloy is preferably substantially free of Fe, Mn, Cr, Li, Si, Mo, V, Ni, and/or Rare Earth Elements (other than Sc, such as lanthanoids, yttrium, cerium, erbium, and gadolinium). As used herein, the phrase "substantially free" means having no significant amount of that component purposefully added to the composition to import a certain characteristic to that alloy (as contrasted with intentional ingredients listed above), it being understood that trace amounts of incidental elements and/or impurities may sometimes find their way into a desired end product (e.g. due to contamination from incidental additives or through contact with certain processing and/or holding equipment, as described above). Preferably, the alloy comprises less than about 0.05% by weight of one or more of Fe, Mn, Cr, Li, Si, Mo, V, Ni, and/or Rare Earth Elements (other than Sc, such as lanthanoids, yttrium, cerium, erbium, and gadolinium), more preferably less than about 0.005% by weight, and more preferably less than about 0.001% by weight of one or more of the foregoing elements (each alone or in combination), based upon the total weight of the alloy taken as 100% by weight.

The new alloys can be used to make wrought or cast products including traditional forgings and castings, as well as rolled plates 0.250 inches thick), sheets (0.006 to 0.249 inches thick), bars, or extrusions that can be subsequently machined into complex shapes. In one or more embodiments, the invention provides wrought or cast products formed from the inventive alloys described above. Advantageously, these products have improved mechanical properties, and particularly increased strength, at temperatures up to about 500° F., preferably from about 350° F. to about 500° F., more preferably from about 375° F. to about 450° F., and are particularly suited for high temperature applications ranging from about 400° F. to about 450° F. Accordingly, wrought and cast products produced according to the invention can be used in situations where aluminum-based alloys would normally be replaced by titanium alloys, such as in high performance engines. Likewise, the thickness and size of the inventive products do not have to be increased to achieve high temperature performance, as with conventional aluminum-based alloys.

More specifically, in some embodiments, there is provided a cast product comprising the inventive alloy. The cast product can be formed using any suitable casting process including sand casting, die casting, or permanent and/or semi-permanent mold casting. In a general method of casting, the aluminum alloy is provided in molten form and poured into a casting mold of the desired shape. The formulation is then allowed to cool until solidified (e.g., from about 5 minutes to about 2 hours). It will be appreciated that the time period for solidification will depend upon the configuration (i.e., shape) and size of the casting, as well as the nature of the mold used in the process. The solidified raw casting is then separated from the casting mold. Depending upon the casting process used and the shape formed, risers or other remnants can be removed from the casting using known techniques.

The casting can then be heat treated. For example, the casting can be subjected to homogenization by heating the casting to a temperature of at least about 900° F., preferably from about 910° F. to about 950° F., and more preferably from about 920° F. to about 930° F., for at least about 2 hours, preferably from about 4 to about 48 hours, and more preferably for about 16 to about 32 hours. The casting can also be subjected to solution heat treatment with subsequent quench. More specifically, the casting is slowly heated to the solution heat treating temperature of at least about 920° F., preferably from about 930° F. to about 1,000° F., and more preferably from about 940° F. to about 985° F., and maintained at that temperature for at least about 30 minutes, preferably from about 45 minutes to about 4 hours, and more preferably for about 1 hour to about 2.5 hours. The casting is then quenched using a suitable quenchant, such as air, water, or a solvent (e.g., glycol), with water quenching being particularly preferred. The casting can also be subjected to artificial aging. For example, the casting can be heated to a temperature of at least about 280° F., preferably from about 300° F. to about 500° F., and more preferably from about 325° F. to about 450° F., and maintained at that temperature for at least about 2 hours, preferably from about 6 hours to about 24 hours, and more preferably for about 8 hours to about 16 hours. Heating for the above processes is generally carried out in an oven. The temperatures indicated above designate the temperature of the casting itself, which can be measured, if desired, by using a thermocouple attached to the casting. It will be appreciated that any of the above treatments may be performed alone or in combination with any of the other above treatments.

The inventive alloys are suitable for making castings of virtually any size, dimension, or shape, including large castings and castings intended for structural parts. Cast products that can be made using the inventive alloys include, without limitation, ingot, billet (round or square), automobile, aircraft, or marine engines and/or engine components, appliance parts, tools, automotive or aircraft wheels, pistons, engine blocks, and/or high performance automobile racing components.

Although any of the inventive formulations disclosed herein can be used to make castings, a particularly preferred alloy formulation for casting comprises (or consists essentially of):

greater than about 4% by weight Cu;
from about 0.2 to about 1% by weight Mg;
from about 0.1 to about 1.5% by weight Ag;
from about 0.15 to about 0.35% by weight Ti;
optionally from about 0.1 to about 0.2% by weight Zr;
from about 0.05 to about 1% by weight Se; and
balance consisting essentially of aluminum and incidental elements and impurities, wherein the percentages by weight are based upon the total weight of the alloy taken as 100% by weight.

Cast products according to the invention have a number of beneficial properties. For example, the alloys can be used to make cast products having significantly improved elongation and ductility, as well as strength. In particular, when formed into a 3" thick×8" long×14" tall blocks, 2-3" sections of the cast alloy will have a UTS of greater than about 55 ksi, preferably greater than about 60 ksi, and more preferably greater than about 65 ksi, when tested according to ASTM E8. The inventive castings also have exceptional strength after exposure to extreme temperatures. That is, in the extreme temperature test, the casting is heated to the designated temperature and maintained at that temperature for the indicated time. The casting is then permitted to return to ambient temperature (~75° F.), whereupon the UTS is tested according to ASMT E8. In particular, when formed into a 1"×1"×24" square rod, the cast alloy will have a UTS at ambient temperature (~75° F.) of greater than about 55 ksi, preferably greater than about 60 ksi, and more preferably greater than about 72 ksi, when heated to a temperature of about 400° F. for 100 hours and allowed to return to ambient temperature, when tested according to ASTM E8. The inventive castings when formed into a 1"×1"×24" square rod, will also preferably have a % elongation of greater than about 6.5%, more preferably greater than about 9%, and even more preferably greater than about 12%, when tested according to ASTM E8. Preferably, the new alloys can be used to produce Grade A castings. As will be understood by those in the art, "Grade A" castings, as used herein, refers to the highest quality castings per the Department of Defense Handbook MIL-HDBK-1265 (Radiographic Inspection, Classification and Soundness Requirements for Steel Castings) and is defined for Radiographic Grade A Castings as meaning no discontinuities in the form of gas porosity, sand or slag inclusion, shrinkage, crack, nor hot tear in castings of up to 2 inches in thickness. It will be appreciated that this is an extremely difficult grade to attain especially for sand castings. The cast alloys according to the invention will be substantially free of defects, including voids, pores, and/or cracks (e.g., internal wedge cracks, surface-connected cracks, etc.). More specifically, defect-free castings according to the invention will include less than about 3% by volume defects, preferably less than about 1% by volume will include defects, and more preferably less than about 0.5% by volume will include defects. Advantageously, due to the lack of defects in castings prepared according to the invention, the inventive cast products require no reworking. That is, unlike previous castings which contain defects that must be ground out and filled in, the present castings do not have to be reworked prior to using in subsequent processes.

In one or more embodiments, there is also provided a wrought product comprising an inventive alloy disclosed herein. Wrought products can be formed using any suitable wrought processing, including forging (hammer or press), extruding, rolling, pressing, and/or stamping, optionally followed by solution heat treatment, straightening, stretching, squeezing, bending, drawing, shearing, and/or compression stress relief when required to control distortion and/or increase strength, followed by natural or artificial aging. In addition the wrought products can be subjected to other types of cold working including shot-peening or peen-forming, when desired. In one or more embodiments, after the initial shaping process, the wrought workpieces can be heat treated. For example, a shaped piece can be subjected to solution treatment with subsequent quench. More specifically, the wrought piece is slowly heated to the solution heat treating temperature of at least about 920° F., preferably from about 930° F. to about 1,000° F., and more preferably from about 940° F. to about 985° F., and maintained at that temperature for at least about 30 minutes, preferably from about 45 minutes to about 4 hours, and more preferably for about 1 hour to about 2.5 hours. The wrought product is then quenched using a suitable quenchant, such as air, water, or a solvent (e.g., glycol), with water quenching being particularly preferred. The wrought products can also be subjected to cold working by intentionally inducing plastic deformation (e.g., by squeezing, bending, drawing, stretching, peening, and/or shearing) to exact a shape change at a temperature below the alloy's recrystallization temperature (e.g., under ambient temperatures). The shaped piece can also be subjected to artificial aging. For example, the wrought product can be heated to a temperature of at least about 280° F., preferably from about 300° F. to about 500° F., and more preferably from about 325° F. to about 450° F., and maintained at that temperature for at least about 2 hours, preferably from about 6 hours to about 24 hours, and more preferably for about 8 hours to about 16 hours. Heating for the above processes is generally carried out in an oven. The temperatures indicated above designate the temperature of the wrought piece itself, which can be measured, if desired, by using a thermocouple attached to the piece. It will be appreciated that any of the above treatments may be performed alone or in combination with any of the other above treatments.

The wrought product can then be rough machined and then finish machined to final dimensions. Wrought products that can be made using the inventive alloys include, without limitation, plates, sheets, aerospace components (e.g., engine components, fuel tanks, structural components, containers, airplane wheels, aircraft thrust reversers, aircraft nacelle inlet structures, etc.) underwing applications, automobile parts (e.g., connecting rods, crankshafts, wheel spindles, axle beams, pistons, gears, wheels, and steering arms), and/or forged automobile racing engines.

Although any of the inventive alloys described herein can be used to form wrought products, a particularly preferred formulation for wrought processing comprises (or consists essentially of):
greater than about 4% by weight Cu;
from about 0.2 to about 1% by weight Mg;
from about 0.1 to about 1.5% by weight Ag;
from about 0.15 to about 0.35% by weight Ti;
optionally from about 0.1 to about 0.2% by weight Zr;
from about 0.05 to about 1.5% by weight Co; and
balance consisting essentially of aluminum and incidental elements and impurities, wherein the percentages by weight are based upon the total weight of the alloy taken as 100% by weight.

Wrought products according to the invention have a number of beneficial properties. For example, high strength at ambient and elevated temperatures, as well as after exposure to elevated temperatures. Advantageously, unlike existing wrought aluminum alloys, the wrought alloys of the invention have a much smaller loss of strength and much lower degradation after extreme temperature exposure. That is, the UTS (according to ASTM E8) of the inventive wrought alloys after exposure to about 450° F. for 200 hours will decrease by less than about 15% as compared to the initial UTS (i.e., before high temperature exposure) of the wrought alloy, preferably the UTS will decrease by less than about 12%, and more preferably less than about 8%. In other words, the wrought alloys have an initial UTS, and when heated to about 450° F. for 200 hours and permitted to return to ambient temperature (~75° F.) have a subsequent UTS that is no less than about 85% of the initial UTS, preferably no less than about 88% of the initial UTS, and more preferably no less than about 92% of the initial UTS (according to ASTM E8). Likewise, the hardness (Rockwell Hardness) of the inventive wrought alloys after exposure to about 450° F. for 200 hours will decrease by less than about 30% as compared to the initial hardness (i.e., before high temperature exposure) of the wrought alloy, preferably the hardness will decrease by less than about 25%, and more preferably less than about 15%, as measured according to ASTM E18. In other words the subsequent hardness after exposure to the extreme temperature for the time period noted above will be no less than about 70% of the initial hardness, preferably no less than about 75% of the initial hardness, and more preferably no less than about 85% of the initial hardness according to ASTM E18. Preferably, the hardness of the wrought alloy after exposure to 450° F. for 200 hours will be greater than about 35, preferably greater than about 40, and more preferably greater than about 45 when measured at ambient temperature (~75° F.), when measured according to ASTM E18.

Additional advantages of the invention will be apparent to those in the art based upon the disclosure herein, as well as the working examples below.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

EXAMPLES

The following examples set forth methods in accordance with the invention. It is to be understood, however, that these examples are provided by way of illustration and nothing therein should be taken as a limitation upon the overall scope of the invention.

Example 1

Aluminum Alloy Castings

In this Example, various alloys were cast using sand cast blocks (3"×8"×14"), and a typical protocol for aerospace-grade aluminum sand castings. Experimental alloy formulations were compared to a very strong/high strength conventional alloy (Aluminum Association designation #20'-T7) as the Control. The test alloy formulations are provided in the Table below.

TABLE 1

Aluminum Alloy Formulations

| Alloy[A] | Cu | Mg | Ag | Ti | Zr | Sc | Co | V | Zn |
|---|---|---|---|---|---|---|---|---|---|
| #4 | 5.29% | 0.50% | 0.50% | 0.26% | 0.12% | — | 0.30% | — | — |
| #5 | 5.29% | 0.50% | 0.50% | 0.26% | — | 0.31% | — | — | — |
| #6 | 5.29% | 0.50% | 0.50% | 0.26% | 0.12% | 0.31% | — | — | — |
| #7 | 5.29% | 0.50% | 0.50% | 0.16% | 0.12% | 0.29% | — | — | — |
| #8 | 5.29% | 0.80% | 0.50% | 0.16% | 0.12% | 0.29% | — | — | — |
| #9 | 5.29% | 0.80% | 0.50% | 0.26% | — | — | 0.30% | — | — |
| #15 | 5.29% | 0.82% | 0.49% | 0.16% | — | — | — | — | — |
| #16 | 5.29% | 0.80% | 0.50% | 0.16% | 0.12% | 0.29% | — | — | 0.80% |
| #17 | 5.29% | 0.50% | 0.50% | 0.26% | 0.12% | 0.31% | — | — | 0.80% |

[A]Balance aluminum and incidental elements and impurities for each formulation.
All percentages are % by weight of the component, based upon the total weight of the alloy taken as 100% by weight.

Figure 1B:
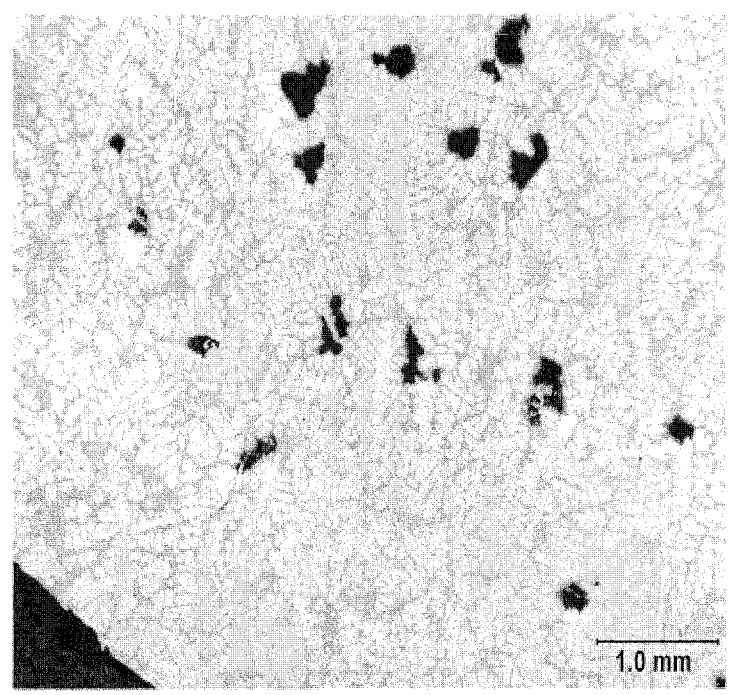
FIG. 1(B) is a comparative photomicrograph of a conventional aluminum casting alloy (Aluminum Association Designation #356) cast according to Example 1.

The alloy formulations were each poured into the casting blocks and cooled for approximately 2 hours. The raw castings were excised from the short transverse direction of the cast. All castings were then heat treated as follows. Homogenization was carried out by heating the castings to 920° F. for 24 hours. The castings were then solution heat treated at 920° F. for 2 hours, followed by a water quench. The castings were then aged by heating to 375° F. for 9 hours. FIG. 1(A) is a photomicrograph (25×) of the microstructure of Alloy #16 as compared to the photomicrograph of a conventional aluminum casting alloy (#356) in FIG. 1(B). The extremely fine grain structure can be seen in the inventive alloy as well as the absence of shrinkage cavities, inclusions, and large dendrites, which are clearly visible in the conventional alloy.

Figure 2:
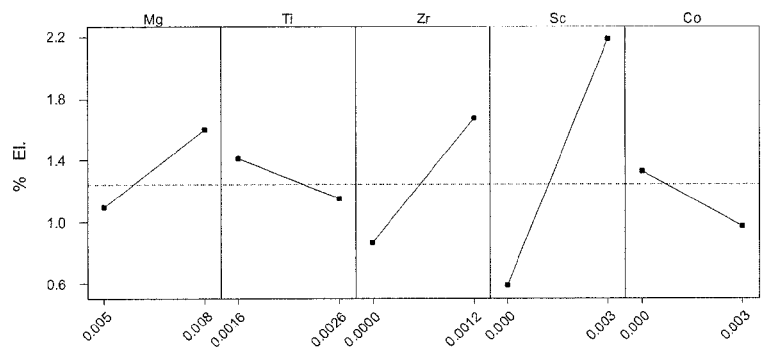
FIG. 2 is a graph showing the effect of various elements on Ductility (% Elongation) for the alloys in Example 1.
Figure 3:
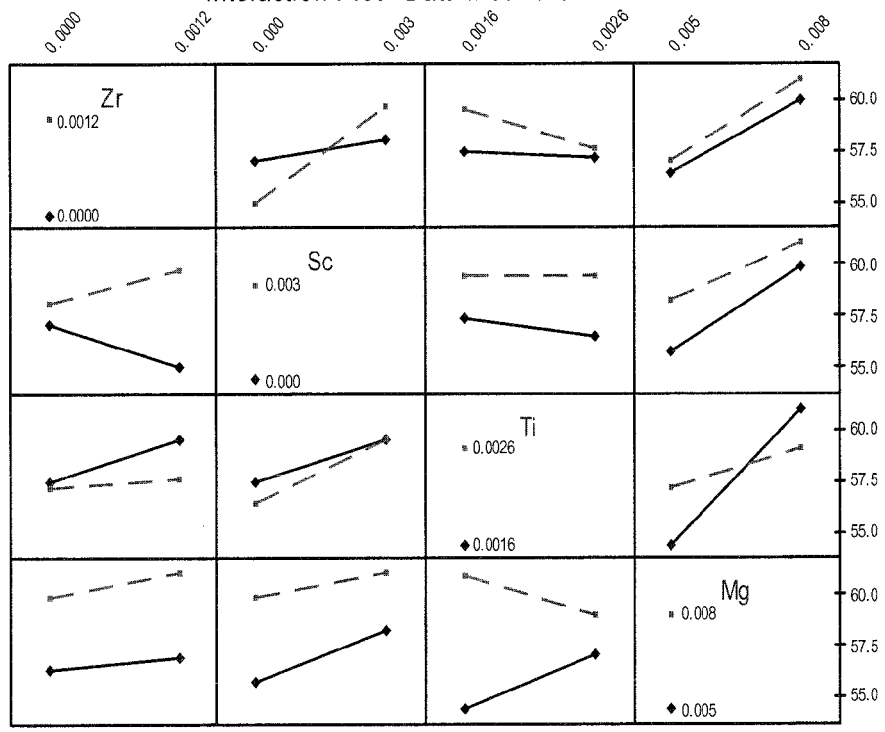
FIG. 3 is a graph showing the interaction of various elements on Ultimate Tensile Strength ("UTS") in the alloys from Example 1.

The castings were then tested for Ultimate Tensile Strength (UTS), Tensile Yield Strength (TYS), and % Elongation (% EL) according to ASTM E8 and ASTM B557. The tensile properties are shown in the Table below, as well as in FIG. 2 and FIG. 3.

TABLE 2

Tensile Properties

| Alloy | UTS (ksi) | Mean UTS | TYS (ksi) | Mean TYS | % EL | UTS 400° F./ 100 hrs[A] |
|---|---|---|---|---|---|---|
| #4 | 56.2 | 55.6 | 54.7 | 54.7 | 1.9 | — |
|  | 55.1 |  |  |  | 2.0 |  |
| #5 | 59.3 | 58.1 | 52.2 | 51.6 | 3.8 | — |
|  | 56.9 |  | 51.1 |  | 3.3 |  |
| #6 | 59.7 | 60.6 | 56.3 | 56.4 | 2.0 | 55.7 |
|  | 60.7 |  | 55.5 |  | 2.0 |  |
|  | 61.5 |  | 57.5 |  | 2.2 |  |
| #7 | 54.5 | 54.7 | 50.7 | 50.8 | 2.5 | — |
|  | 54.9 |  | 50.9 |  | 2.7 |  |
| #8 | 64.6 | 65.3 | 59.8 | 60.7 | 2.0 | 54.1 |
|  | 66.0 |  | 61.6 |  | 1.8 |  |
| #9 | 59.3 | 59.1 | 58.5 | 58.4 | 2.0 | — |
|  | 58.9 |  | 58.4 |  | 1.9 |  |
| #15 | 60.1 | 60.4 | 57.9 | 59.0 | 1.0 | 50.7 |
|  | 61.5 |  | 60.0 |  | 1.0 |  |
|  | 59.5 |  | 59.2 |  | 0.8 |  |
| #16 | 63.0 | 63.6 | 58.1 | 58.6 | 3.0 | 55 |
|  | 62.1 |  | 56.6 |  | 2.0 |  |
|  | 65.8 |  | 61.3 |  | 2.1 |  |
| #17 | 62.0 | 60.3 | 58.8 | 57.1 | 2.0 | — |
|  | 58.6 |  | 55.4 |  | 2.0 |  |
| Control | 45.1 | 45.1 | 41.7 | 41.8 | 1.0 | — |
|  | 45.0 |  | 42.0 |  | 1.0 |  |

[A]UTS of test bars after being heated to 400 ± 5° F. for 100 hours in an oven. Temperature was recorded using a thermocouple attached to each bar and indicates temperature of the castings themselves. Test bars were then removed from the oven and tensile properties were determined at ambient temperature per ASTM E8 to test degradation of the room temperature properties of the castings as a function of exposure to extreme temperature.

Aerospace Material Specification (AMS) 4229 for alloy 201.0-T7 only specifies mechanical properties for castings with nominal thickness of 1.0 inch and under (48 ksi for yield strength, 56 ksi for UTS, and 1.5% for % elongation). For section sizes above 1 inch in thickness, the casting designers are supposed to consult with foundry engineers to establish tensile property requirements since thicker castings are expected to have inferior properties. Also for comparison purposes, the tensile property requirements for another convention alloy (#356-T6) are as follows: 15 ksi for yield strength, 22.5 ksi for UTS, and 0.7% for % elongation. The data demonstrates the improved strength of the inventive alloys over conventional high strength aluminum alloys.

The data also shows the positive effects of higher Mg, Sc, and Zr on casting elongation, and on the UTS when Sc is present in the casting formulation.

Figure 4:
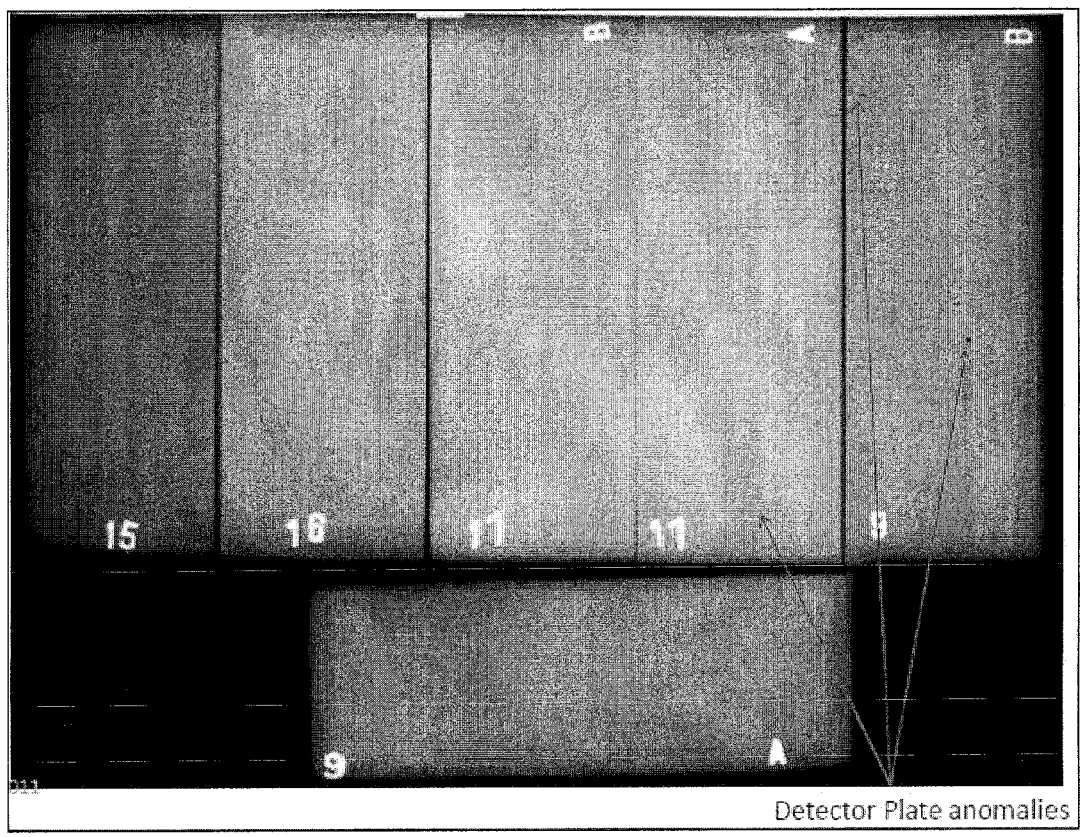
FIG. 4 is a digital X-ray of large blocks cast in Example 1 from the inventive alloys.

FIG. 4 shows digital X-rays of the cast alloys, demonstrating their excellent internal quality. No defects were found in any of the castings. The indicated anomalies were determined to be due to the X-ray detector plate and not related to the castings themselves. Surprisingly, 19 out of 20 X-ray shots exhibited completely clean castings, indicating the exceptional castability of these alloys. All castings were considered Grade A material (per DOD Handbook MIL-HDBK-1265) and were virtually defect-free. The protocol followed in this Example was intended to minimize defects, but instead unexpectedly resulted in near perfect castings for each test formulation. These results are very unusual for aluminum alloy sand castings, as a certain level of defects and inclusions are generally expected and tolerated in the industry. Defect areas are routinely ground out and filled. The castings in this example required no such reworking.

Example 2

Wrought Aluminum Alloys

Figure 5A:
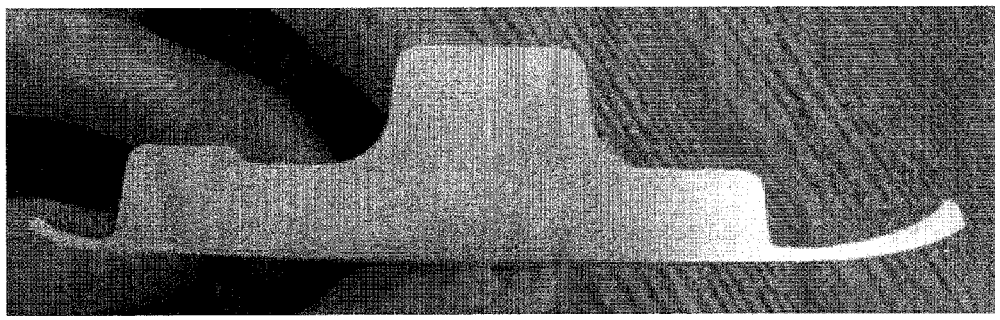
FIG. 5(A) is a photograph of a wrought-shaped piece formed using a casting remnant of Alloy #4 in Example 2.
Figure 5B:
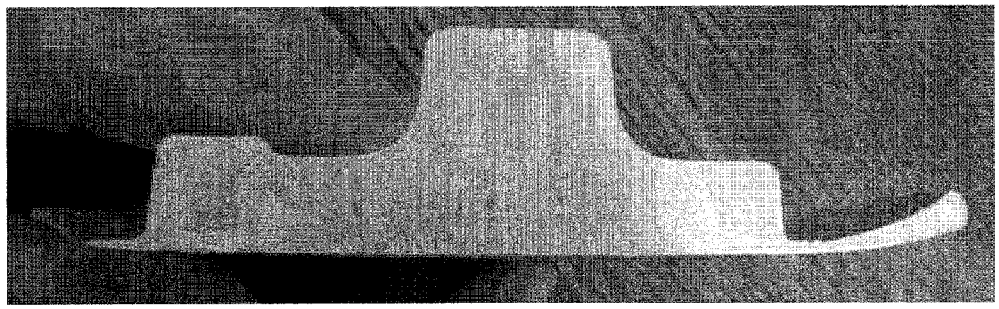
FIG. 5(B) is a comparative photograph of a wrought-shaped piece formed using a conventional, high-temperature forging alloy (#2014)

In this Example, various experimental alloy formulations were forged and then compared to a conventional high temperature forging Al alloy (#2014) as the Control. Alloy #2014 is a high temperature forging alloy commonly used for standard aircraft wheels. For wrought processing, remnants (risers) from the castings for each alloy in Example 1 above were subjected to a two-step forging process using a 300-ton press, a die temperature of 700° F., and an 800° F. oven. Alloy #2014 was subjected to the same forging process. FIG. 5(A) is a photograph of a forged piece of alloy #4, whereas FIG. 5(B) is a photograph of the conventional alloy (#2014). As can be seen from the photographs, the inventive alloy has a much finer and more uniform grain size as compared to the conventional alloy. The forging workpieces were solution treated ("ST") at 920° F. for 2 hours, and then water quenched.

The tensile properties of the forged pieces were then determined. The results are provided in the Table below. Alloys in Group A were further subjected to aging at 375° F. for 9 hours. Alloys in Group B were subjected to 25% cold work (25% specific deformation at room temperature) and 5 hours of aging at 375° F. Alloys in Group C were subjected to 12 hours of aging at 325° F.

TABLE 3

Measured Tensile Properties of Wrought Al Alloys

| | A | | | B | | | C | | |
|---|---|---|---|---|---|---|---|---|---|
| Alloy | UTS (ksi) | TYS (ksi) | % EL | UTS (ksi) | TYS (ksi) | % EL | UTS (ksi) | TYS (ksi) | % EL |
| #4 | 60.6 | 54.5 | 11.6 | 65.1 | 59.6 | 9.5 | 69.8 | 65.3 | 6.70 |
| #6 | 59.0 | 50.6 | 13.5 | 70.8 | 66.1 | 9.8 | 72.3 | 67.9 | 8.20 |
| #7 | 58.4 | 50.6 | 14.2 | 66.2 | 61.2 | 9.9 | 65.6 | 61 | 9.7 |
| #8 | 60.4 | 53.2 | 9.9 | 71.4 | 67.5 | 11.1 | 72.6 | 69.6 | 8.4 |
| #9 | 67.0 | 60.4 | 11.1 | 74.2 | 69.6 | 9.1 | 75.6 | 70.2 | 7.0 |
| #15 | 62.0 | 54.3 | 12.1 | 70.1 | 65.4 | 9.7 | 71.9 | 67.3 | 8.2 |
| #16 | 66.7 | 58.9 | 14.2 | 71.5 | 66.5 | 9.0 | 74.1 | 70 | 8.2 |
| #17 | 55.5 | 47.4 | 14.3 | 65 | 60.4 | 9.5 | 66.1 | 61.7 | 9.8 |

Some of the forging workpieces were then subjected to various combinations of heat treatment. Some of the pieces were also subjected to cold working ("CW") before aging. Additional pieces were subjected to overage heat treatment (OAHT) by subjecting the alloys to temperatures beyond peak strength of the materials. Aging was carried out at various temperatures and for various amounts of time.

Figure 6:
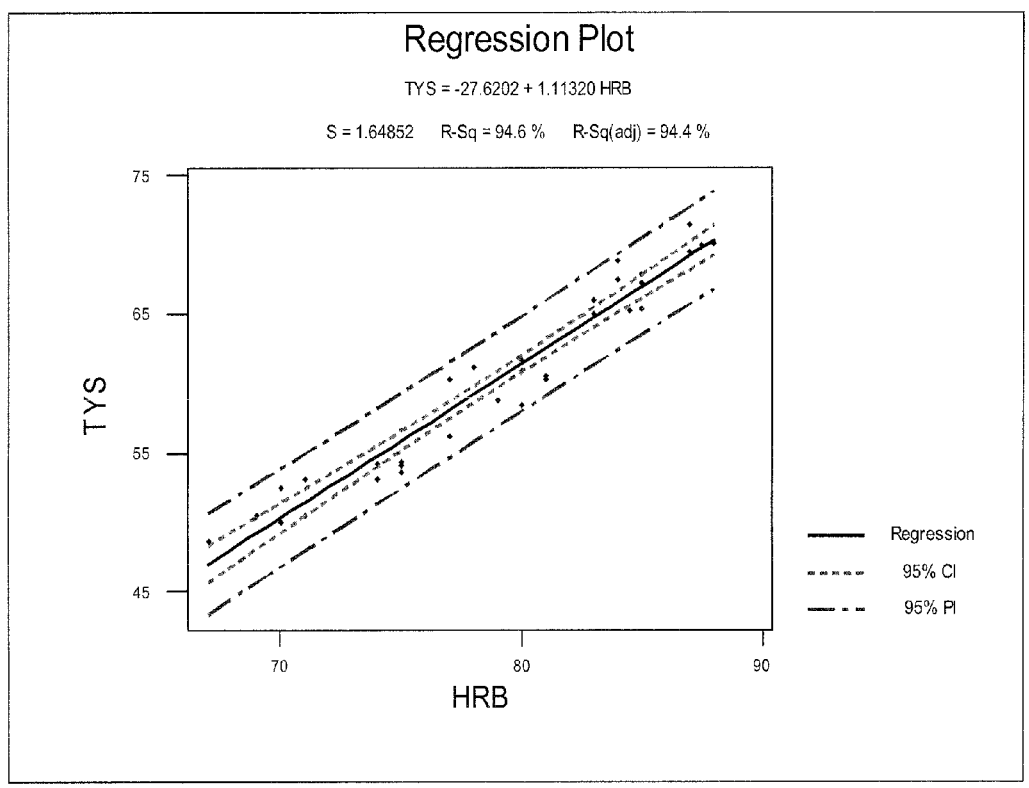
FIG. 6 is a graph demonstrating the correlation between strength (Tensile Yield Strength; "TYS") and hardness (Rockwell Hardness; "HRB") from Example 2.

The Rockwell Hardness (HRB) of the wrought alloys was then determined according to ASTM E18. The results are in the Table below. FIG. 6 also shows the very good correlation between strength and hardness, indicating that hardness can be used as an analog to tensile testing for preliminary screening.

TABLE 4

Measured Rockwell Hardness

| Alloy | ST 920 F./ 2 hr | 375 F./ 2 hr | 375 F./ 9 hr | 375 F./ 13 hr | 375 F./ 15 hr | 375 F./ 20 hr | 375 F./ 24 hr | 465 F./ 2 hr | 465 F./ 2 hr + 375 F./ 5 hr | 465 F./ 2 hr + 375 F./ 10 hr | ST + 25% CW | ST + 25% CW + 375 F./ 2 hr | ST + 25% CW + 375 F./ 5 hr | ST + 25% CW + 375/5 hr + 325 F./ 12 hr |
|---|---|---|---|---|---|---|---|---|---|---|---|---|---|---|
| #4  | 60 | 71 | 75 | 77 | 77 | 77 | 77 | 63 | 67 | 68 | 81 | 83 | 83 | 84.5 |
| #6  | 53 | 58 | 69 | 71 | 71 | 73 | 73 | 59 | 62 | 65 | 81 | 84 | 83 | 85 |
| #7  | 55 | 62 | 71 | 70 | 70 | 69 | 68 | 51 | 57 | 59 | 73 | 79 | 78 | 80 |
| #8  | 63 | 64 | 74 | 75 | 75 | 77 | 77 | 58 | 63 | 63 | 82 | 83 | 84 | 84 |
| #9  | 68 | 74 | 81 | 81 | 81 | 79 | 78 | 60 | 64 | 64 | 83 | 87 | 87 | 88 |
| #15 | 61 | 71 | 74 | 75 | 75 | 75 | 75 | 57 | 62 | 63 | 79 | 84 | 85 | 85 |
| #16 | 68 | 79 | 79 | 80 | 80 | 77 | 76 | 58 | 63 | 63 | 83 | 87 | 87 | 87.5 |
| #17 | 56 | 63 | 67 | 70 | 70 | 71 | — | 51 | 56 | 57 | 77 | 80 | 77 | 80 |

The table below provides a comparison of various tensile and hardness properties after the wrought workpieces were subjected to various heat treatments and cold working parameters.

TABLE 5

Tensile and Hardness Properties of Alloys

| Alloy | TYS Cast | TYS 375 F./ 15 hr @QA | TYS 25% CW + 375 F./ 5 hr + 325/12 hr | HRB after 450 F./ 100 hr | STD Age HRB after 450 F./ 200 hr | OAHT HRB after 450 F./ 200 hr | UTS 375 F./ 15 hr | UTS 25% CW + 375 F./ 5 hr + 325 F./ 12 hr | % EL 375 F./ 15 hr |
|---|---|---|---|---|---|---|---|---|---|
| #4  | 54.7 | 56.3 | 65.5 | 43 | 43 | 47 | 59.7 | 70.2 | 10 |
| #6  | 56.3 | 53.2 | 67.4 | 39 | 24 | 35 | 58.1 | 71.8 | 12 |
| #7  | 50.8 | 52.5 | 61.8 | 32 | 20 | 30 | 58.1 | 66.3 | 12 |
| #8  | 60.7 | 53.7 | 69.2 | 47 | 32 | 38 | 58.9 | 72.2 | 13 |
| #9  | 58.4 | 60.6 | 70.2 | 49 | 49 | 49 | 65.2 | 74.6 | 10 |
| #15 | 59.0 | 54.2 | 66.3 | 47 | 40 | 38 | 59.9 | 71.1 | 13 |
| #16 | 58.6 | 58.5 | 70.3 | 52 | 47 | 48 | 64.4 | 74.4 | 13 |
| #17 | 57.1 | 50   | 60.6 | 36 | 27 | 35 | 55.6 | 64.8 | 14 |
| 2219 | — | 37 | 50 | — | — | 42 | — | — | — |
| 7075 | — | —  | 54 | — | — | 12 | — | — | — |
| 2024 | — | —  | —  | — | — | 29 | — | — | — |

Figure 7:
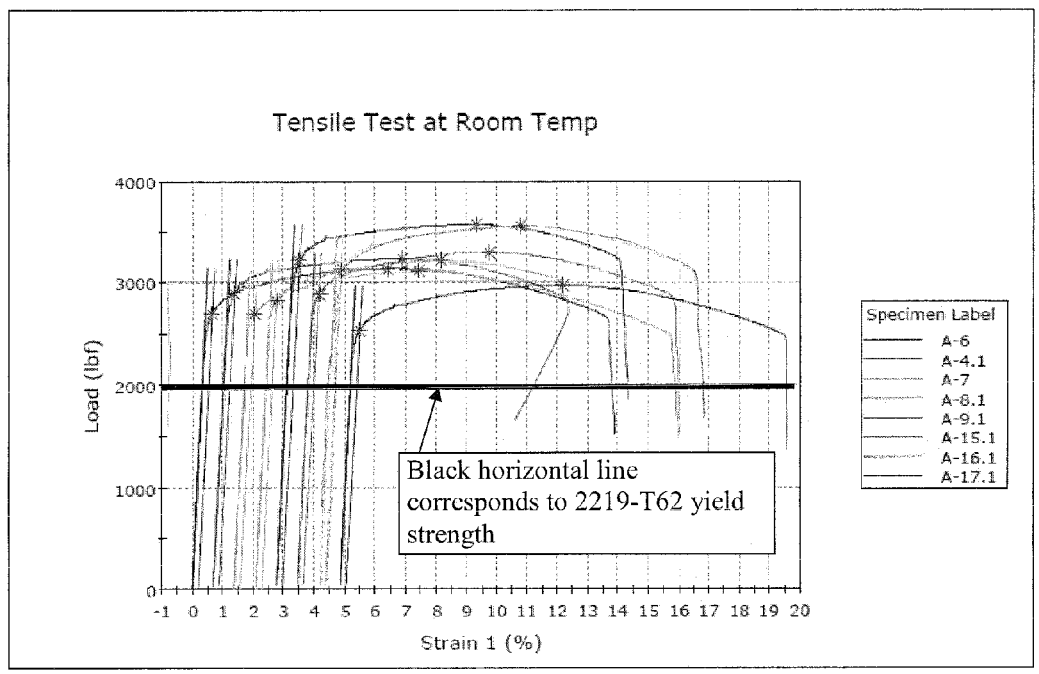
FIG. 7 is a graph plotting the tensile properties of the inventive alloys as compared to an extremely good high temperature aluminum alloy (#2219) at the same temper.

As can be seen from the data, the UTS values for alloys subjected to 25% CW+375 F/5 hrs+325 F/12 hrs were significantly higher for the inventive alloys, as compared to conventional 2000 series alloys. FIG. 7 provides an overlay of the tensile properties of the alloys in their T62 temper (375 F/15 hr@QA) versus the current gold standard for high temperature aluminum alloys (2219-162). As can bee seen from the graph, the inventive alloys have significantly higher strength values. Also, hardness values for Alloys #4, 9, and 16 subjected to OAHT are significantly higher than conventional alloys exposed to the same parameters as shown in the Table above. It is noted that alloy #2014 is one of the best known high strength aluminum alloys, while #7075 is currently considered to be one of the highest strength aluminum alloys available.

Figure 8:
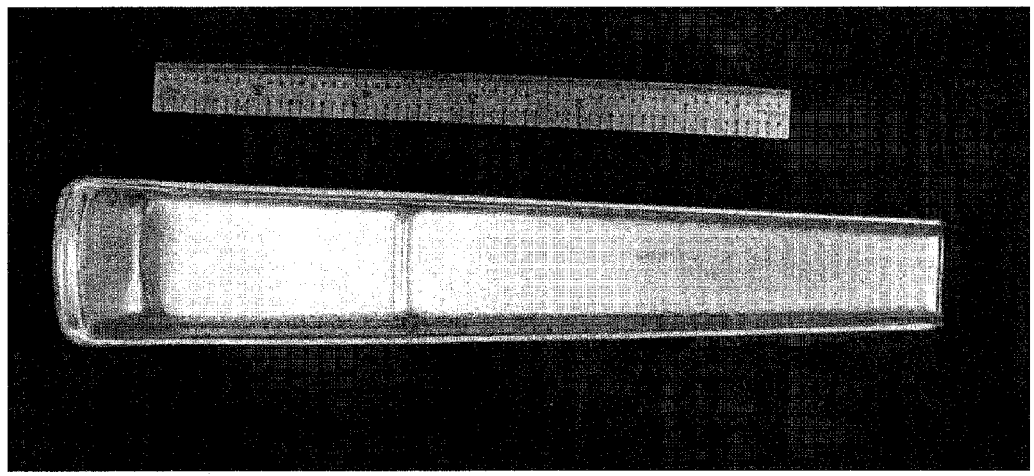
FIG. 8 is a photograph of a precision forged shape specifically indicated for alloy #6061.
Figure 9:
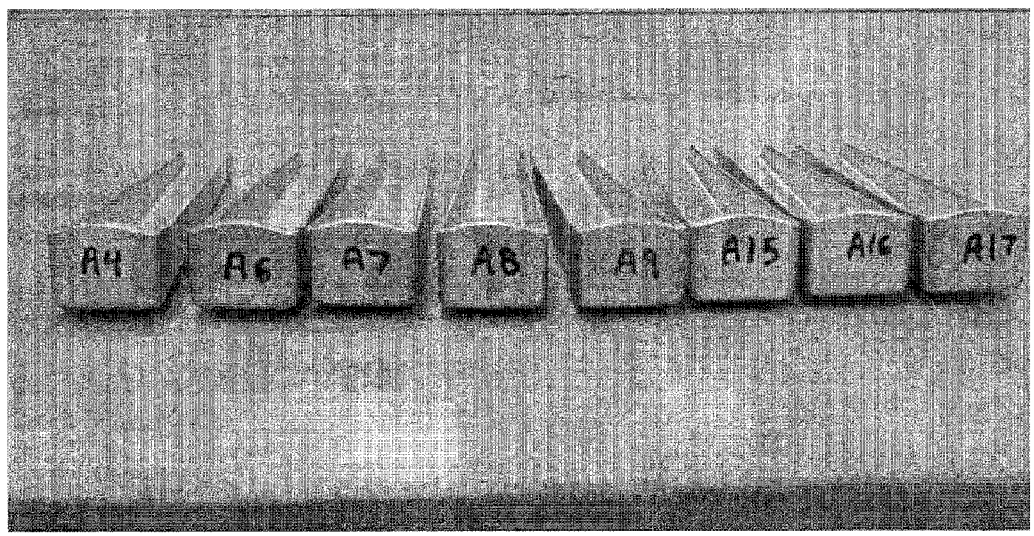
FIG. 9 is a photograph of precision forged shapes using the inventive alloys.

FIGS. 8 and 9 show additional photographs of a precision forged alloy shape, which demonstrate the excellent forgeability of these alloys. Forging such near net shape configurations cannot be done with conventional high strength Al alloys (2000 or 7000 series alloys). The fine and uniform microstructures of these alloys make forging near net shapes possible. These shapes were made by two forging steps using ¾"×¾"×6" blocks as the forging dies. No rework was necessary for these parts. The only post-forging work carried out was heat treatment, followed by conventional hand trimming of excess material, de-burring, and pre-penetrant etching. The forgings were completely clean via Fluorescent Penetrant Inspection (FPI). According to the forging house, which performed the forging blind (i.e., without knowledge that the alloys were new), high strength 2000 and 7000 series Al alloys cannot be forged into these configurations. The forging dies were originally constructed for 6061 series alloys, which is a much easier forging alloy.

We claim:

1. An aluminum-based alloy comprising:
   4 to 6% by weight Cu;
   0.2 to 1% by weight Mg;
   0.1 to 1.5% by weight Ag;
   0.15 to 0.35% by weight Ti;
   0.25 to 1.5% by weight Co;
   0.05 to 1% by weight Zn;
   less than 0.05% by weight Mn;
   optionally 0.1 to 0.2% by weight Zr; and
   balance aluminum and incidental elements and impurities, said % by weight being based upon the total weight of the alloy taken as 100% by weight, wherein said alloy is substantially free of Si.

2. The alloy of claim 1, wherein said alloy is substantially free of an element selected from the group consisting of Fe, Mo, Li, Cr, and Rare Earth Elements other than Scandium.

3. The alloy of claim 1, further comprising up to about 0.1% by weight V.

4. The alloy of claim 1, further comprising Ni, wherein the ratio of Co:Ni is greater than about 2:1.

5. The alloy of claim 1, said alloy comprising up to 0.05% by weight of each incidental element or impurity, wherein the total incidental element or impurity content is up to 0.15% by weight, based upon the total weight of the alloy taken as 100% by weight.

6. The alloy of claim 1, wherein the ratio of Mg:Zn is greater than about 0.5:1.

7. The alloy of claim 1, said alloy comprising less than about 0.005% by weight Si, based upon the total weight of the alloy taken as 100% by weight.

8. The alloy of claim 1, wherein Zr is present in said alloy in an amount of from about 0.1 to about 0.2% by weight.

9. A wrought or cast product formed from an aluminum-based alloy comprising:
  greater than 4% by weight Cu;
  less than 1% by weight Mg, wherein Cu+Mg is from about 4.5 to about 6.75% by weight;
  0.1 to 1.5% by weight Ag;
  0.15 to 0.35% by weight Ti;
  0.25 to 1.5% by weight Co;
  0.05 to 1% by weight Zn;
  less than 0.05% by weight Mn;
  optionally 0.1 to 0.2% by weight Zr; and
  balance aluminum and incidental elements and impurities, said % by weight being based upon the total weight of the alloy taken as 100% by weight, wherein said alloy is substantially free of Si.

10. The wrought or cast product of claim 9, wherein said product is a casting selected from the group consisting of ingot, billet, automobile engines, aircraft engines, marine engines, engine components, appliance parts, tools, automotive wheels, aircraft wheels, pistons, engine blocks, and high performance automobile racing components.

11. The casting of claim 10, wherein said casting is a Grade A casting.

12. The wrought or cast product of claim 9, wherein said product is a casting, said casting when heated to a temperature of about 400° F. for 100 hours and permitted to return to ambient temperature, having a UTS at ambient temperature of greater than about 55 ksi when formed into a 1"×1"×24" square rod, when tested according to ASTM E8.

13. The wrought or cast product of claim 9, wherein said product is a casting, when formed into a 1"×1"×24" square rod, having a % elongation of greater than about 6.5%, when tested according to ASTM E8.

14. The wrought or cast product of claim 9, wherein said product is a wrought product selected from the group consisting of plates, sheets, aerospace engine components, aerospace fuel tanks, aerospace structural components, aerospace containers, airplane wheels, aircraft thrust reversers, aircraft nacelle inlet structures, aircraft underwing components, automobile connecting rods, crankshafts, wheel spindles, axle beams, pistons, gears, wheels, steering arms, and forged automobile racing engines.

15. The wrought or cast product of claim 9, wherein said product is a wrought product, said product having an initial UTS, and wherein said wrought product when heated to 450° F. for 200 hours and permitted to return to ambient temperature has a subsequent UTS that is no less than about 85% of said initial UTS, when tested according to ASTM E8.

16. The wrought or cast product of claim 9, wherein said product is a wrought product, said wrought product when heated to a temperature of about 450° F. for 200 hours and permitted to return to ambient temperature, having a subsequent Rockwell Hardness of greater than about 35 at ambient temperature, when tested according to ASTM E18.

17. A cast aluminum alloy product comprising:
  greater than 4% by weight Cu;
  less than 1% by weight Mg, wherein Cu+Mg is from about 4.5 to about 6.75% by weight;
  0.1 to 1.5% by weight Ag;
  0.15 to 0.35% by weight Ti;
  0.25 to 1.5% by weight Co;
  0.05 to 1% by weight Zn;
  less than 0.05% by weight Mn;
  optionally 0.1 to 0.2% by weight Zr;
  0.05 to 1% by weight Sc; and
  balance aluminum and incidental elements and impurities, wherein the percentages by weight are based upon the total weight of the alloy taken as 100% by weight, said alloy being substantially free of Si.

18. A method of making a cast aluminum alloy product, said method comprising:
  (a) providing an alloy in molten form comprising:
    greater than 4% by weight Cu;
    less than 1% by weight Mg, wherein Cu+Mg is from about 4.5 to about 6.75% by weight;
    0.1 to 1.5% by weight Ag;
    0.15 to 0.35% by weight Ti;
    0.25 to 1.5% by weight Co;
    0.05 to 1% by weight Zn;
    less than 0.05% by weight Mn;
    optionally 0.1 to 0.2% by weight Zr; and
    balance aluminum and incidental elements and impurities, said % by weight being based upon the total weight of the alloy taken as 100% by weight, wherein said alloy is substantially free of Si;
  (b) pouring said alloy into a casting mold; and
  (c) allowing said alloy to solidify to yield said cast aluminum alloy product.

19. The method of claim 18, further comprising:
  (d) separating said cast aluminum alloy product from said mold; and
  (e) subjecting said cast aluminum alloy product to heat treatment.

20. The method of claim 18, wherein said cast aluminum alloy product requires no reworking.

21. A wrought aluminum alloy product comprising:
  greater than 4% by weight Cu;
  0.2 to 1% by weight Mg, wherein Cu+Mg is from about 4.5 to about 6.75% by weight;
  0.1 to 1.5% by weight Ag;
  0.15 to 0.35% by weight Ti;
  optionally 0.1 to 0.2% by weight Zr;
  0.25 to 1.5% by weight Co;
  0.05 to 1% by weight Zn;
  less than 0.05% by weight Mn; and
  balance consisting essentially of aluminum and incidental elements and impurities, wherein the percentages by weight are based upon the total weight of the alloy taken as 100% by weight, said alloy being substantially free of Si.

22. The wrought aluminum alloy product of claim 21, said alloy comprising less than about 0.005% by weight Si, based upon the total weight of the alloy taken as 100% by weight.

23. The wrought aluminum alloy product of claim 21, wherein Zr is present in said alloy in an amount of from about 0.1 to about 0.2% by weight.

24. A method of forming a wrought aluminum alloy product, said method comprising:
  (a) providing a casting of an alloy comprising:
    greater than 4% by weight Cu;
    0.2 to 1% by weight Mg, wherein Cu+Mg is from about 4.5 to about 6.75% by weight;

0.1 to 1.5% by weight Ag;
0.15 to 0.35% by weight Ti;
0.25 to 1.5% by weight Co;
0.05 to 1% by weight Zn;
less than 0.05% by weight Mn;
optionally 0.1 to 0.2% by weight Zr; and
balance aluminum and incidental elements and impurities, said % by weight being based upon the total weight of the alloy taken as 100% by weight, wherein said alloy is substantially free of Si; and (b) shaping said casting by a process selected from the group consisting of forging, extruding, rolling, pressing, stamping, straightening, stretching, squeezing, bending, drawing, shearing, compression stress relief, shot-peening, peen-forming, and combinations thereof to yield said wrought aluminum alloy product.

25. The method of claim 24, further comprising subjecting said wrought aluminum alloy product to heat treatment before, after, or before and after said shaping (b).

26. An aerospace structural component formed from an aluminum alloy comprising:
greater than 4% by weight Cu;
0.2 to 1% by weight Mg, wherein Cu+Mg is from about 4.5 to about 6.75% by weight;
0.1 to 1.5% by weight Ag;
0.15 to 0.35% by weight Ti;
optionally 0.1 to 0.2% by weight Zr;
0.25 to 1.5% by weight Co;
0.05 to 1% by weight Zn;
less than 0.05% by weight Mn; and
balance aluminum and incidental elements and impurities, wherein the percentages by weight are based upon the total weight of the alloy taken as 100% by weight, said alloy being substantially free of Si.

* * * * *